United States Patent [19]
Hankison

[11] 3,891,410
[45] June 24, 1975

[54] DEHYDRATING COMPRESSED AIR AND GASES

[76] Inventor: Paul M. Hankison, c/o Hankison Corporation, College & Pike, Canonsburg, Pa. 15317

[22] Filed: July 30, 1973

[21] Appl. No.: 384,006

[52] U.S. Cl. .......................... 55/20; 55/33; 55/179
[51] Int. Cl. ............................................. B01d 53/04
[58] Field of Search .............. 55/20, 31, 33, 62, 179

[56] References Cited
UNITED STATES PATENTS

| | | |
|---|---|---|
| 3,225,517 | 12/1965 | Wachsmuth ........................... 55/31 |
| 3,470,069 | 9/1969 | Bracken et al. ........................ 55/20 |
| 3,477,204 | 11/1969 | Jackson .............................. 55/179 |
| 3,490,201 | 1/1970 | Colvin et al. .......................... 55/34 |
| 3,731,458 | 5/1973 | McGrath .............................. 55/179 |

*Primary Examiner*—Charles N. Hart
*Attorney, Agent, or Firm*—Donn J. Smith

[57] ABSTRACT

Apparatus for dehydrating air or gas comprises a condensor, a refrigerating system coupled to the condensor, a conduit arrangement for conducting the gas through the condensor in heat exchange relation with a chilled liquid supplied by the refrigerating system, and a desiccant dehydrating system coupled to the conduit arrangement downstream of the condensor. A regenerative heat exchanger is coupled to the conduit arrangement upstream of the condensor, with an output of the desiccant dehydrating system coupled to the regenerative heat exchanger in heat exchange relation to the gas passing therethrough.

8 Claims, 3 Drawing Figures

DEHYDRATING COMPRESSED AIR AND GASES

The present invention relates to a method and means for dehydrating compressed air and other gases, and more particularly to method and means of the character described employing a combination of refrigeration and desiccant techniques.

In various manufacturing operations or processes using compressed air or other gases, it is necessary to dehydrate or partially dehydrate the air or other gas to prevent condensation of water vapor contained therein, and resultant corrosion of the conduits. Elimination of such condensation also prevents clogging and corrosion of the conduits for various control instrumentation coupled to the main gas or air line. Elimination of condensation is also critical, where the conduits may be subjected to freezing temperatures, as noted below. It is also essential to use dry air or partially dried air in various industrial processes, such as paint spraying.

As the air or gas is piped to various locations within or without the plant, quite often, the conduits through which the gas or air is transported are subjected to a wide range of ambient temperatures, depending upon location and a particular manufacturing facility. This is particularly true where the conduit extends outside a plant or building or between buildings and thus are subjected to seasonal temperature variations. In the more northern climates such temperature variations can be quite severe between summer and winter conditions, and in consequence the necessary dehydrating equipment for the compressed air or other gas must be designed to produce a sufficiently low dew point (usually about −40° F for most temperate climates) to prevent condensation and freezing of moisture contained in the gas during wintertime.

For this reason, conventional compressed air dehydrators have used desiccant type equipment despite their higher cost, their use of part of the pre-product air for regeneration, and requirement in many cases of an external heat source to complete the regeneration. Refrigerant dehydration equipment, on the other hand, is capable of achieving dew points in compressed air or gas only as low as about +35° F, which obviously is too high for most wintertime conditions. Thus, conventionally, desiccant dehydration equipment has been employed year-round for the aforementioned applications when actually the desiccant is needed only for wintertime operations, thereby necessitating a more complex installation, in addition to greater operating difficulties and maintenance.

There are also numerous occasions wherein quantities of partially dehydrated (e.g., a dew point of about +35° F.) and fully dehydrated (e.g., a dew point of about −40° F.) air or gas are required at the same time as when only a portion of the compressed air or gas is piped outside of a plant or building in wintertime or where the product air or gas is used for differing applications of differing sensitivity to moisture content.

The present invention solves the aforementioned problems by utilizing refrigerant and desiccant drying operations in series, with an arrangement for partially or fully by-passing the desiccant operation during non-wintertime or non-freezing conditions, or otherwise when only partial dehydration is required.

The desiccant operation, for example, desirably is only partially by-passed as when quantities of product air or gas of differing dew points are required at the same time for the reasons mentioned previously. Use of the refrigerant dehydration removes approximately 90% of the water vapor in the incoming gas with the result that the size of the desiccant equipment can be reduced drastically while still meeting the usual demands for fully dehydrated air or gas. Where the product air or gas is subjected to temperature gradients, ranging for example to points below freezing, it is contemplated that the aforementioned bypassing arrangement can be thermostatically controlled so that, for example, the desiccant equipment can be coupled and decoupled automatically with respect to the refrigerant dehydrator depending upon the existance or nonexistance of subfreezing conditions.

It is also contemplated that, in accordance with another feature of the invention, that either or both of the outputs of the refrigerant unit and desiccant unit can be partially or completely coupled in regenerative heat exchange with the compressed air or gas input to the refrigerant unit to afford either partially or fully dehydrated product air or gas at a desired temperature ranging between that of the compressed air or gas input and the outlet of the refrigerant dehydrator.

I overcome the disadvantages of the prior art and accomplish the aforementioned objectives by providing apparatus for dehydrating air or gas, said apparatus comprising a condensor, a refrigerating system coupled to said condensor, conduit means for conducting said gas through said condensor in heat exchange relation with a chilled liquid supplied by said refrigerating system, a desiccant dehydrating system coupled to said conduit means downstream of said condensor, and a regenerative heat exchanger coupled to said conduit means upstream of said condensor, an output of said desiccant dehydrating system being coupled to said regenerative heat exchanger in heat exchange relation to the gas passing therethrough.

I also desirably provide similar dehydration apparatus wherein said conduit means include valved conduit means coupled to said desiccant system and to said condensor and regenerative heat exchanger so that the output of said condensor can be coupled to said regenerative heat exchanger selectively through said desiccant system and in by-passing relation thereto.

I also desirably provide similar dehydration apparatus wherein said valve conduit means include a four-way valve.

I also desirably provide similar dehydration apparatus wherein said four-way valve is provided with a powered operator having thermostatic means for controlling the operation thereof.

I also desirably provide similar dehydration apparatus wherein a valved outlet conduit is coupled to the outlet of said condensor upstream of said desiccant system and said regenerative heat exchanger for selective or similtaneous removal of low temperature partially dehydrated gas from said apparatus.

I also desirably provide similar dehydration apparatus wherein said valved outlet conduit is coupled to a second regenerative heat exchanger coupled to said conduit means in series with the first-mentioned regenerative heat exchanger and with said condensor for reheating of said partially dehydrated gas while product gas from said desiccant system is reheated in said first-mentioned regenerative heat exchanger.

I also desirably provide a method for dehydrating air or gas, said method comprising the steps of supplying said air or gas at an elevated temperature, refrigerating said gas to condense moisture therefrom and to lower the temperature thereof to a point near the freezing point of water, removing a remaining portion of the moisture contained in said air or gas by desiccant absorption, and thereafter regeneratively heat exchanging the air or gas output of said desiccant absorption with the air or gas input to said refrigerating step.

In the past, various combinations of refrigerant and desiccant dryers or dehydrators have been devised as typified by the patents to Kern, Jr. U.S. Pat. No. 3,148,040; Karwat U.S. Pat. No. 3,355,879; Jackson U.S. Pat. No. 3,144,314; Wachsmuth U.S. Pat. No. 3,225,517; and Asker U.S. Pat. No. 3,204,388. None of these references disclose the novel features of the invention such as those outlined above.

During the foregoing discussion, various objects, features and advantages of the invention have been set forth. These and other objects, features and advantages of the invention together with structural details thereof will be elaborated upon during the forthcoming description of certain presently preferred embodiments of the invention and presently preferred methods of practicing the same.

In the accompanying drawings I have shown certain presently preferred embodiments of the invention and have illustrated certain presently preferred methods of practicing the same wherein.

Figures 1, 1A:
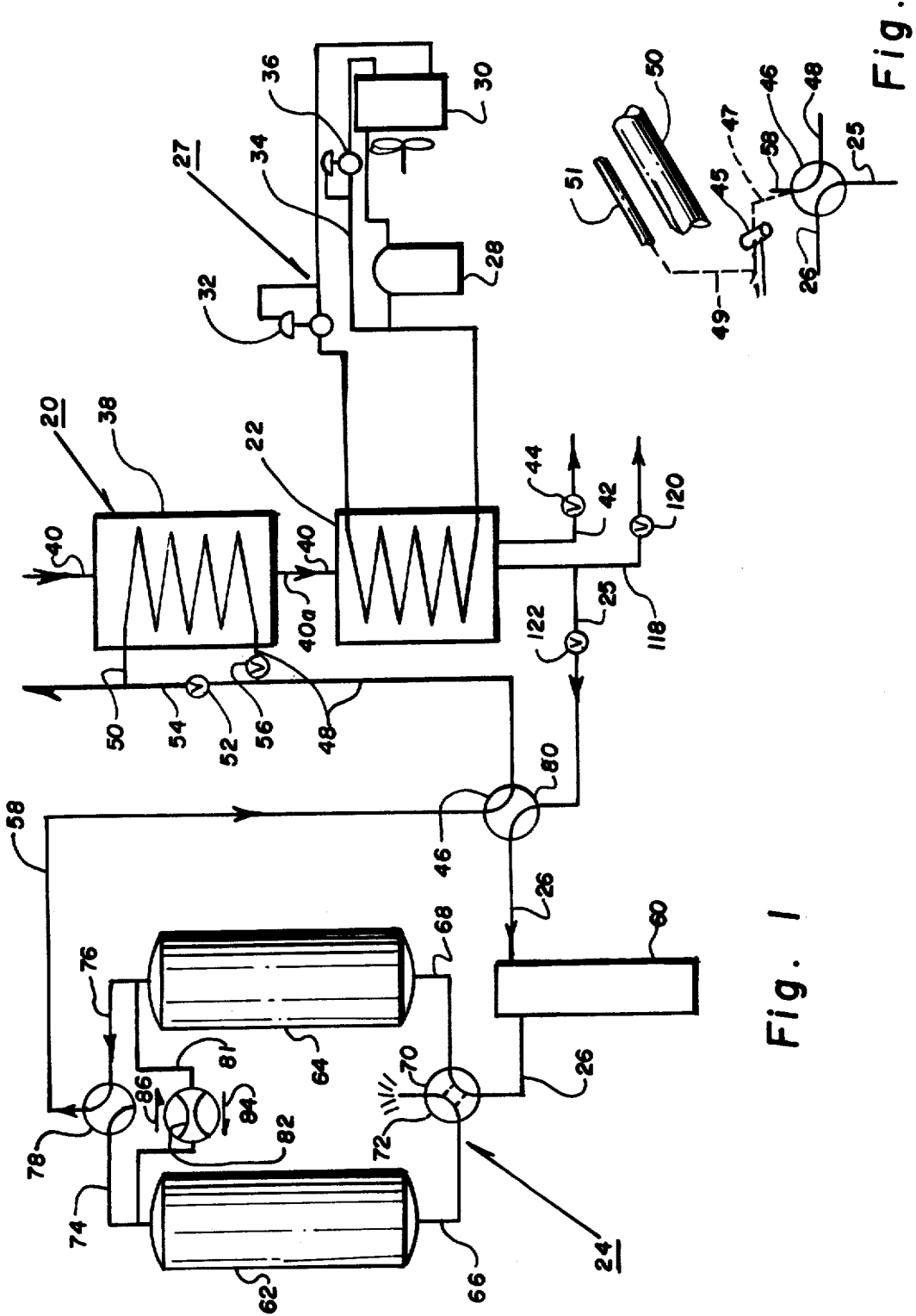
FIG. 1 is a schematic fluid circuit diagram of one arrangement of the dehydrating system of the invention.
FIG. 1A is a partial fluid circuit diagram showing a modification of the control arrangement in FIG. 1.

Referring now more particularly to FIG. 1 of the drawings, the dehydrating system 20 shown therein and arranged in accordance with the invention comprises a refrigerated heat exchanger 22 and a desiccant drying system denoted generally at 24 and coupled to the refrigerated heat exchanger through conduit 26. In this example, the heat exchanger 22 constitutes an evaporator of a refrigerant system 27 comprising a compressor 28, condensor 30, expansion valve 32, and hot gas bypass system 34. A regulating valve 36 is included in the hot gas by-pass system 34 and is sensitive to system pressure.

Before entering the refrigerated heat exchanger or evaporator 22 the incoming air or other gas to be treated passes through a regenerative heat exchanger 38 coupled in inlet conduit 40 for the refrigerated heat exchanger 22.

Desirably the temperature in the evaporator 22 is maintained slightly above the freezing point of water of avoid freeze-up of the condensed water vapor extracted from the air or gas being dehydrated. This freeze-up prevention is accomplished through well-known design considerations in the refrigerant system 27. In those applications where it is anticipated that the demand for the product air or gas may be intermittant or may vary within wide ranges, the hot gas by-pass system 34-36 couples an intermediate point of the condensor 30 to the compressor 28. This enables continuous operation of the compressor and prevents the cascading of heat therein.

The condensed moisture collecting in the bottom of the product side of the evaporator 22 can be eliminated through discharge conduit 42. This can be done either intermittently or automatically depending upon the character of the discharge valve 44. Preferably an automatic discharge valve is employed for the valve 44 so that the condensate within the evaporator 22 is periodically and automatically blown down, by means of suitable level sensors and the like. A suitable form of automatic drain valve is available from Hankison Corporation, Canonsburg, Penna., catalog No. 501 and is described further in Bulletin No. 0500-5.

When extremely low dew points are not required or desired, the product air or gas issuing from the evaporator 22 can be supplied directly to the regenerative heat exchanger 38 through conduits 25 and 48 by proper setting of four-way valve 46. Assuming compressed air of about 100° F. is introduced to the regenerative heat exchanger 38, by way of example, the temperature of the reheated, product air or gas issuing from the regenerative heat exchanger 38 (conduit 50) can be about 85° F. with a dew point of about +35° F. Continuing with the aforesaid example, the incoming air or gas flowing from the regenerative heat exchanger 38 to the evaporator 22 (conduit 40a) has been reduced to about 65° F. while that issuing from the evaporator 22 (conduit 25) is 35° to 40° F. The temperature of the product air or gas can be lowered to a range between 35° F and 85° F by fully or partially opening valve 52 in shunting conduit 54 and fully or partially closing valve 56. In that event, of course, the load upon the refrigerating system 27 is considerably increased to the extent that the regeneration by-passing valve 52 is opened, for the example given, as the incoming air would enter the evaporator 22 at a temperature ranging from 65° F upward to about 100° F. Depending upon the position of the four-way valve 46 the air or gas can be partially dehydrated (dew point, +35° F) or fully dehydrated (dew point, −40° F) at a preselected temperature ranging between 35° or 40° F. and about 85° F.

When the four-way valve 46 is turned to its position as shown in FIG. 1 the desiccant dehydrating equipment 24, alluded to previously, is coupled in series with the refrigerating system 27 and the regenerative heat exchanger 38 via conduits 26 and 58 which are coupled respectively through valve 46 to the previously mentioned conduits 25 and 48 respectively. In the illustrated arrangement a suitable filter 60 or the like is coupled in conduit 26 to minimize contamination of the desiccant dehydrating system 24.

Desirably the desiccant drying system 24 is regenerable and in furtherance of this purpose includes dual desiccant chambers 62, 64 which are coupled through conduits 66, 68 respectively to a four-way valve 70. As shown in FIG. 1 the conduit 26 which delivers cold and partially dried product air or gas from the evaporator 22 has its terminous at the four-way valve 70. Depending upon the position of the four-way valve 70, one of the desiccant chambers, for example the chamber 62, is coupled to ambient (conduit 72) while the other desiccant chamber, for example the chamber 64, is coupled to the outlet of the refrigerated heat exchanger 22 through conduits 25, 26 when the four-way valves 46, 70 are positioned as shown. The other respective ends of the desiccant chambers 62, 64 are connected through conduits 74, 76 respectively to a three-way valve 78 and thence through the aforementioned conduits 48, 58 and four-way valve 46 to the regenerative heat exchanger 38.

Continuing the aforementioned example, with the four-way valve 46 set as shown to couple the refrigerant and desiccant units 27, 24 in series, dehydrated air or gas issues from the product side of the regenerative heat exchanger 38 (conduit 50) at substantially the same temperature as noted previously, i.e. about 85° F. However, the product air or gas is now fully dehydrated having a sub-zero (−0° F) dew point, the actual value of which depends upon the character of the conventional desiccant material within chambers 62, 64. On the other hand, if chilled, fully dehydrated air is desired, valve 52 can be opened and valve 56 closed such that the product gas by-passes the regenerative heat exchanger 38 and issues at a temperature of 35° to 40° F. while still preserving its aforementioned sub-zero dew point. As is the case when the refrigerant unit 27 is employed alone, as by manipulating the four-way valve 46 to its position denoted by dash-outlined passage 80 to by-pass the desiccant system 24, various temperatures between about 40° F and 85° F (for the aforementioned example) can be obtained by suitably setting the valves 52, 56.

The desiccant dehydrating system 27 is self-regenerating, and in furtherance of this purpose one of the desiccant chambers, for example the chamber 62, is regenerated while the other chamber is in the adsorption stage of the operating cycle. This is accomplished by conduit 81 and reverse bleed orifice 82 (arrow 84) which bridge the outlets 74, 76 of the desiccant chambers 62, 64. When one of the outlets for example the desiccant chamber outlet 74 is blocked by the three-way valve 78 a small portion of the compressed air or gas is reverse-flowed through the desiccant chamber 62 and is thereupon exhausted to atmosphere through four-way valve 70 and the exhaust conduit 72. As the regenerating air or gas is reverse-flowed through the dessicant chamber during the regenerating stage at a much lower or at ambient pressure, only a small portion of the compressed air or gas is required for this purpose.

Traditional methods for reactivating the desiccant can be employed. For example, an external blower (not shown) can generate low pressure air which has been heated to a suitable reactivating temperature and blown through either of the desiccant towers to be reactivated.

When the four-way valve 70 and the three-way valve 78 are turned to their opposite positions a small portion of the product air or gas flows in the opposite direction through conduit 81 and orifice 82 (arrow 86) to regenerate the other desiccant chamber 64.

The four-way valve 46 can be operated manually, or, if desired, a powered operator can be provided for the valve 46, such as an electric or pneumatic solenoid 45 coupled to the valve 46 by conventional driving linkage noted generally at 47. The powered operator 45 desirably is energized for example by means of a thermostatically controlled switch or actuator 49 in its energizing circuit. The actuator 49 in turn can be controlled by a self contained sensing element (not shown) or by an external sensor 51 positioned in the vicinity of outlet conduit 50, or alternatively in the vicinity of any conduit coupled thereto, either one of which may be exposed to sub-freezing temperatures. Accordingly, when freezing ambient temperatures are encountered, the solenoid 45 is energized to move the valve 46 to its position as shown in FIG. 1 such that the desiccant dehydrating system 24 is coupled in series between the refrigerated dehydrator 22 and the regenerative heat exchanger or reheater 38. In such cases the actuator 49 and solenoid 45 positions the valve 46 as shown in FIG. 1, is detected by the actuator sensor 51, to couple the refrigerant and desiccant units 27, 24 in tandem. On the other hand when the ambient temperature rises above freezing the actuator 49 and solenoid 45 are deactivated, whereupon a conventional spring return (not shown) or the like moves the valve 46 to its dashed-outline position 80 to decouple or by-pass the desiccant dryer 24.

Figure 2:
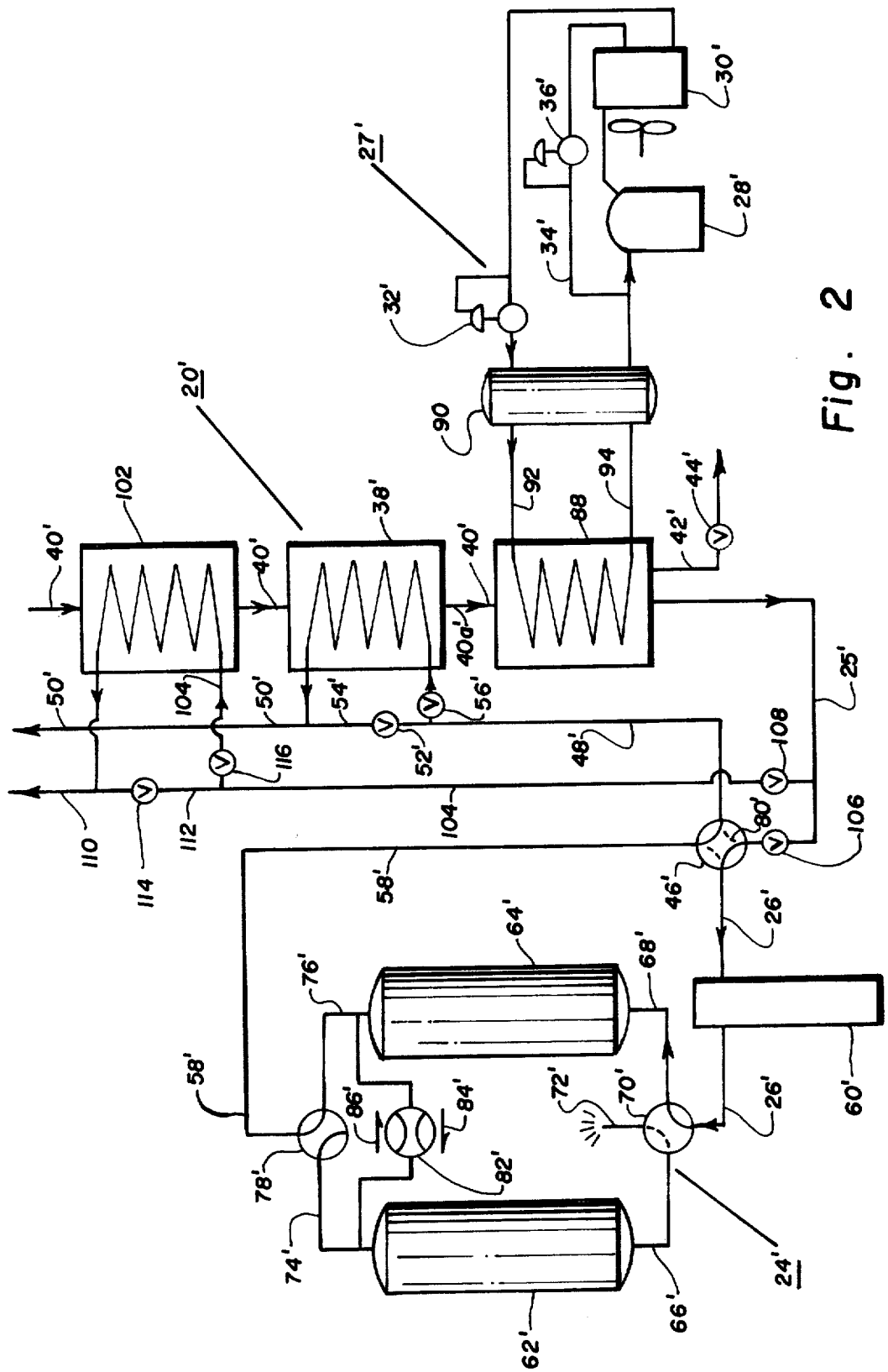
FIG. 2 is a similar diagram of another embodiment of the invention.

Another embodiment of my invention is illustrated in FIG. 2 of the drawings, where similar reference characters with primed accents denote corresponding components of FIG. 1. In this arrangement a separate refrigerating heat exchanger 88 is coupled to the incoming compressed air or gas stream passing through conduit 40'. The heat exchanger 88 in turn is coupled to a conventional evaporator 90 through conduits 92, 94. The evaporator 90 forms part of the refrigerant system 27' as shown, which otherwise functions in the manner described in connection with the refrigerant system 27 of FIG. 1. A desiccant system 24', similar to that described above with reference to FIG. 1, is coupled to the regenerative heat exchanger 38' when the four-way valve 46' is positioned as shown.

In order to supply both fully dehydrated and partially dehydrated gas or air from the dehydrating system 20' a second regenerative heat exchanger 102 is coupled to the incoming air or gas conduit 40' in series with the first-mentioned regenerative heat exchanger 38' and the refrigerating heat exchanger 88. A by-pass conduit 104 is coupled between the outlet conduit 25' of the refrigerating exchanger 88 and the second regenerative heat exchanger 102. The desired proportions of flows through the conduit 26' and 104 can be adjusted by suitable manipulation of valves 106, 108. The temperature leaving the second regenerative heat exchanger 102 (conduit 110) can be modified by means of shunting conduit 112 and valve 114 bridging the conduits 104, 110. For this purpose the valve 114 can be manipulated in conjunction with valve 116 in by-pass conduit 104, the latter of which can be completely closed to provide no reheat and the lowest temperature of the partially dehydrated air or gas supplied through conduits 110, 112, 104.

With the arrangement of FIG. 2, a partially dehydrated product air or gas can be continuously supplied through the outlet conduit 110 at a temperature which can be varied as desired within limits such as set forth above in connection with FIG. 1. At the same time a fully dehydrated product air or gas can be supplied through outlet conduit 50' also at a variable temperature. The respective portions of the partially and fully dehydrated air or gas streams can be determined by proper setting of the valves 106, 108.

If the demand supplied by outlet conduit 110 is always for partially dehydrated product air or gas and if the demand supplied by the outlet conduit 50' is always for fully dehydrated gas or air then the four-way valve 46' can be dispensed with. However, if the application supplied from the outlet conduit 50' sometimes requires fully dehydrated product air or gas and at other times only partially dehydrated gas, it is then desirable to retain the four-way valve 46' in order to lessen the load upon the desiccant dehydrating system 24', as explained previously.

In either of the FIG. 1 and FIG. 2 arrangements the desiccant dehydrating system 24 can be reduced to only a fraction of the size that would be necessary if the desiccant dehydrator 24 were to fully dehydrate the entire amount of compressed air or gas passing through the outlet conduit 50 or 50'. Moreover, by using the desiccant dehydrator 24 or 24' only when freezing or wintertime ambient temperatures are encountered, for example, means that the desiccant dehydrator 24 or 24' could be deactivated for about three fourths of the year which would further reduce operating costs by a very significant extent, in addition to the savings in the first cost of the smaller size of desiccant dehydrator 24 or 24' made possible by removing about 90% of the moisture content with the refrigerant dehydrator 27 or 27'.

An inherent disadvantage of all desiccant dehydrators is the possibility of contamination with lubricating oil and resultant poisoning by carburizing resulting from heating during the regenerative cycle. Part of such lubricating oil is removed in the dislosed embodiments by the filter 60 or 60'. The main portion of such lubricating oil, however, is condensed in the refrigerated heat exchanger 22 or 88 at the same time that the major proportion of the water vapor is condensed from the incoming compressed air or gas. It is also contemplated that the oil coalescing filter described and claimed in my U.S. Pat. Nos. 3,464,186 and 3,572,008 (coinvented by myself and W. Foster Walker) can be used for or in place of the filter 60 or 60'. Alternatively, the filter of the coassigned application of Donald R. Foltz for Ser. No. 254,207 filed May 17, 1972.

Where the desiccant chambers 62, 64 or 62', 64' are regenerated with the aid of heat, such heaters usually must be replaced after about three years of continuous usage. By operating the desiccant drying system only during the winter months the life expectancy of the heaters and of the desiccant can be extended by a factor of four.

As pointed out previously with respect to FIG. 2 the desiccant dehydrator portion of the system 20 can be reduced still further in size where only a portion of the total output system will be seasonally or otherwise exposed to freezing temperatures. For example the product air or gas issuing from conduit 110 of FIG. 2 can be used entirely within the plant or other heated building while only the product air or gas issuing from conduit 50' need be extended between buildings to minimize thereby the quantity of product air or gas exposed to freezing conditions in wintertime. Somewhat the same situation can be provided for in the FIG. 1 arrangement by means of outlet conduit 118 and valves 120, 122. In the FIG. 1 arrangement, however, the product air or gas issuing from conduit 118 is substantially at the temperature of the refrigerated heat exchanger or condensor 22.

In the modification of FIG. 2 it will be understood that the four-way valve 46' likewise can be thermostatically controlled as set forth in the modification of FIG. 1A, with the exception that the sensor 51 will be placed in the vicinity of that portion of the conduit 50' of FIG. 2, or of any conduit connected thereto, which may be exposed to freezing conditions.

From the foregoing it will be seen that a novel and efficient system for dehydrating compressed air and gases has been described. The descriptive and illustrative materials employed herein are utilized for purposes of exemplifying the invention and not in limitation thereof. Accordingly, numerous modifications of the invention will occur to those skilled in the art without departing from the spirit and scope of the invention. Moreover, depending on the application of the invention, it is to be understood that certain features of the invention can be used to advantage without a corresponding use of other features thereof.

I claim:

1. An apparatus for dehydrating air or gas, said apparatus comprising a condensor, a refrigerating system coupled to said condensor and capable of supplying a chilled refrigerant liquid thereto, said chilled liquid having an outlet temperature adjacent the freezing point of water, conduit means for conducting said air or gas through said condensor in heat exchange relation with said chilled liquid so that the dew point of said air or gas is reduced to within a few degrees above the freezing point of water, a desiccant dehydrating system coupled to said conduit means downstream of said condensor, said desiccant system being capable of lowering the dew point of said air or gas to a point below anticipated subfreezing temperatures, said conduit means including valved conduit means coupled to said desiccant system and to said condensor and said utilizing system so that the output of said condensor can be coupled selectively through said desiccant system and in by-passing relation thereto in dependence upon the presence of freezing and subfreezing ambient temperatures, a regenerative heat exchanger coupled to said conduit means upstream of said condensor, said conduit means coupling outputs of said desiccant system and of said condensor to said regenerative heat exchanger, a valved outlet conduit coupled to the outlet of said condensor in by-passing relation to said desiccant system and said regenerative heat exchanger for selective or simultaneous removal of low temperature partially dehydrated air or gas from said apparatus.

2. The combination according to claim 1 wherein said valved outlet conduit is coupled to a second regenerative heat exchanger coupled to said conduit means in series with the first-mentioned regenerative heat exchanger and with said condensor for reheating of said partially dehydrated gas while product gas from said desiccant system is reheated in said first-mentioned regenerative heat exchanger.

3. The combination according to claim 2 wherein a valved shunting conduit is coupled between an inlet and outlet of said second regenerative heat exchanger.

4. A method for dehydrating air or gas with a dew point variable with climatic conditions, said method comprising the steps of supplying said air or gas at a temperature substantially above the freezing point of water, providing a refrigerating zone for said air or gas to condense moisture therefrom and to lower the dew point thereof to a point slightly above the freezing point of water, providing a desiccant absorption zone for further reducing the dew point of said air or gas to a point below anticipated subfreezing ambient temperatures, flowing said air or gas only through said refrigerating zone during the presence of non-freezing ambient temperatures, and flowing said air or gas through both said refrigerating zone and said desiccant zone during the presence of freezing ambient temperatures.

5. The method according to claim 4 including the step of regeneratively heat exchanging the output of said refrigerating step or said desiccant step with air or gas supplied to said refrigerating step.

6. The method according to claim 4 including the modified step of thermostatically controlling said selective flowing step at a temperature corresponding to the freezing point of water.

7. The method according to claim 5 including the additional step of selectively bypassing air or gas from said refrigerating step around said desiccant step and said regenerative step for selective or simultaneous removal of low temperature partially dehydrated air or gas from said refrigerating step.

8. The method according to claim 5 including the additional step of variably shunting said regenerative step for varying the outlet temperature of the product air or gas.

* * * * *